US006360997B1

(12) United States Patent
Saiz

(10) Patent No.: US 6,360,997 B1
(45) Date of Patent: Mar. 26, 2002

(54) AUTOMATIC WING-FLAP

(76) Inventor: Manuel Munoz Saiz, San Emilio 16, 1, 3, Madrid (ES), 28017

( * ) Notice: Subject to any disclaimer, the term of this patent is extended or adjusted under 35 U.S.C. 154(b) by 0 days.

(21) Appl. No.: 09/311,769

(22) Filed: May 13, 1999

(30) Foreign Application Priority Data

Jan. 5, 1999 (ES) ................................................ 9900008

(51) Int. Cl.$^7$ ............................................... B64C 9/00
(52) U.S. Cl. ...................... 244/201; 244/210; 244/213; 244/45 A
(58) Field of Search .................. 244/45 A, 46, 244/201, 213, 210

(56) References Cited

U.S. PATENT DOCUMENTS

| | | | | |
|---|---|---|---|---|
| 2,587,359 A | * | 2/1952 | Milans | 244/210 |
| 3,926,389 A | * | 12/1975 | Mederer | 244/45 A |
| 5,320,310 A | * | 6/1994 | Mitchell | 244/201 |
| 5,495,999 A | * | 3/1996 | Cymara | 244/45 A |

* cited by examiner

*Primary Examiner*—J. Woodrow Eldred
(74) *Attorney, Agent, or Firm*—Robert M. Schwartz

(57) ABSTRACT

An automatic wing-flap that consists of the use of each side of the fuselage of additional small wings, which act simultaneously as individual wings and as flaps, fastened and divided with a rotating shaft parallel to the transversal axis of the aircraft in two pieces of different surface, where the front piece is the smaller, said both different pieces of the wing-flap have different resistance to the air ram, creating a rotation torque as a function of the aircraft's speed, when retracted or at high speed with a horizontal flap attitude, creating an independent wing and when they are completely extended with a maximum angle of attack they act like extended flaps, some extend bands or springs assist or complement the action of the smaller portion of the wing-flap whose resistance is such that, at low speed, the wing-flap remain extended, acting like a flap.

7 Claims, 2 Drawing Sheets

AUTOMATIC WING-FLAP

CROSS REFERENCES TO RELATED APPLICATIONS

This application claims the benefit of Spanish Application No. P9900008, filed on Jan. 5, 1999.

BACKGROUND OF THE INVENTION

1. Field of the Invention

In wing and flaps of high-lift action necessary for low-speed flight.

2. State of the Technique

At present, flaps are manually operated and controlled by complex, duplicated and heavy devices or when they are automatic they need a big force or big springs for the actuation.

DESCRIPTION OF THE INVENTION

The automatic wing-flap of this invention consists of the use on each side of the fuselage of additional small wings, which act simultaneously as individual wings and as flaps, fastened and divided with a rotating shaft parallel to the transversal axis of the aircraft in two pieces of different surface, where the front piece is the smaller, said both different pieces of the wing-flap have different resistance to the air ram, creating a rotation torque as a function of the aircraft's speed, when retracted or at high speed they adopt a horizontal flap attitude, creating an independent wing, and when they are completely extended with a maximum angle of attack they act like extended flaps, some extend bands or springs assist or complement the action of the smaller portion of the wing-flap whose resistance is such that, at low speed, the wing-flap remain extended, acting like a flap.

Rotation end stops hold the wings-flap at their position of furthest retraction, the most nearly horizontal or as at high speed, acting as independent wings with its corresponding lift.

Some anti-gust rams prevent large oscillations.

The wing-flaps can have slots or grooves parallel longitudinal axis of the wing, can be operated with hydraulic, pneumatic actuators and can be used only as independent wings, in this case they are fixed to the fuselage.

One or several pair of wings-flaps can be used and in all cases their resultant have to be close to the center of gravity of the aircraft. For example, a wing-flap can be placed in front and the other behind each wing, although at different levels.

In one variant the aft or bigger piece or part is divided in two pieces or parts, at low speeds, said pieces adopt the shape of a conventional extended flap and at high speeds, the aft part that is hinged or articulated rotates with reference to the main part as a function of the air speed pressure. Opposing to this rotation are one or more springs 13.

In another variant the aft or bigger piece or part is divided in two pieces or parts, at low speeds, said pieces adopt the shape of a conventional extended flap and at high speeds, the aft part that is flexible and is joined to the main part as a function of the air speed pressure. Opposing to this rotation by means of its flexible shape.

Using this arrangement, conventional wings can be smaller, simpler and can be better used its inside.

DETAILED DESCRIPTION OF THE PREFERRED EMBODIMENTS

Figure 1:
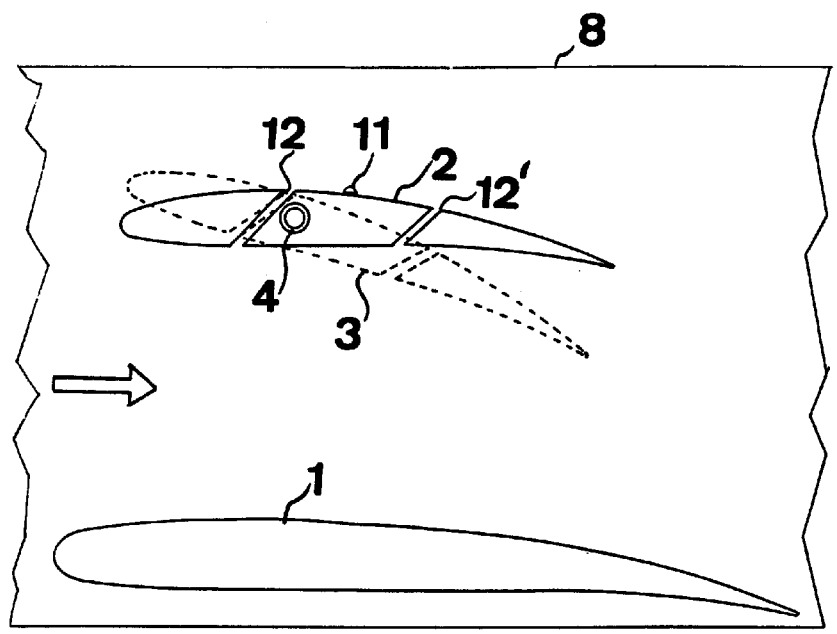
FIG. 1 shows a schematic, partial side cross-section view of a portion of a fuselage with the wing-flap in the invention.

FIG. 1 consists of the wing 1, the retracted wing-flap 2 and extended 3, the rotating shaft 4, and the rotation end stop 11 that hold the wing-flap at their position of furthest retraction, the most horizontal or as at high speed, acting as individual wings with their corresponding lift, and where 12 and 12' are the slots or grooves. Air ram is indicated with an arrow.

Figure 2:
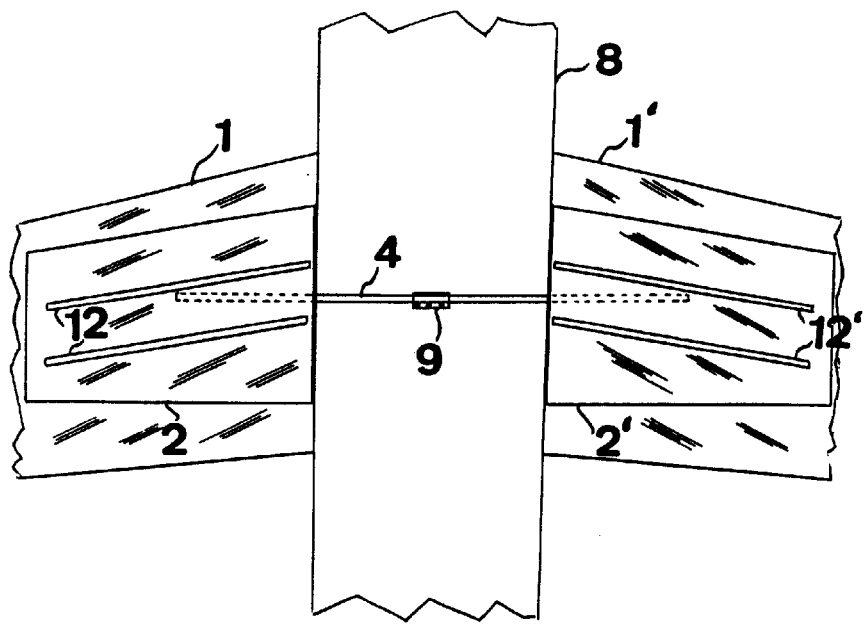
FIG. 2 shows a schematic, partial top view of a portion of the fuselage and the wing with the wing-flap of the invention.

FIG. 2 consists of the wings 1 and 1', the common shaft 4 of interconnection between both wing-flaps 2 and 2', the fuselage 8, the extend spring or band 9 that assists or complement the action of the front or smaller portion of the wing-flap whose resistance is such that, at low speed, the wing-flap remains extended, acting as a flap, where 12 and 12' are the slots or grooves.

Figure 3:
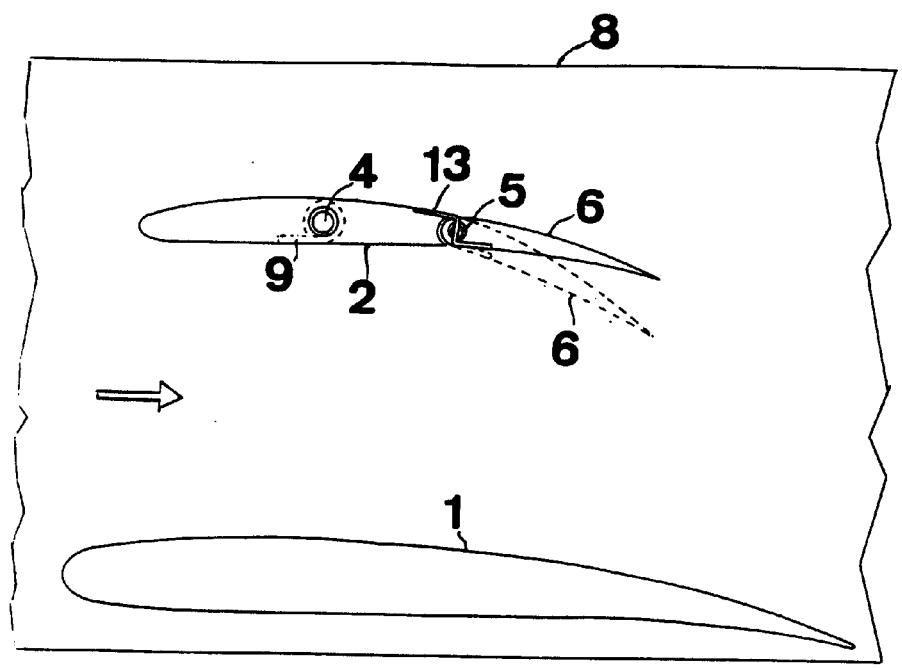
FIG. 3 shows a schematic, partial side view of a portion of the fuselage and the wing with a variant of the wing-flap.

FIG. 3 consists of the wing 1, the wing-flap 2, the rotating shaft of the wing-flap 4 and its extend bands or springs 9 that assist or complement the action of the smaller portion of the wing-flap, rotating shaft 5 of the hinged part 6 and spring or band 13, 6' is the articulated part at low speed. The fuselage 8. At low speeds, the complete wing-flap is extended by the action of the spring 9.

Figure 4:
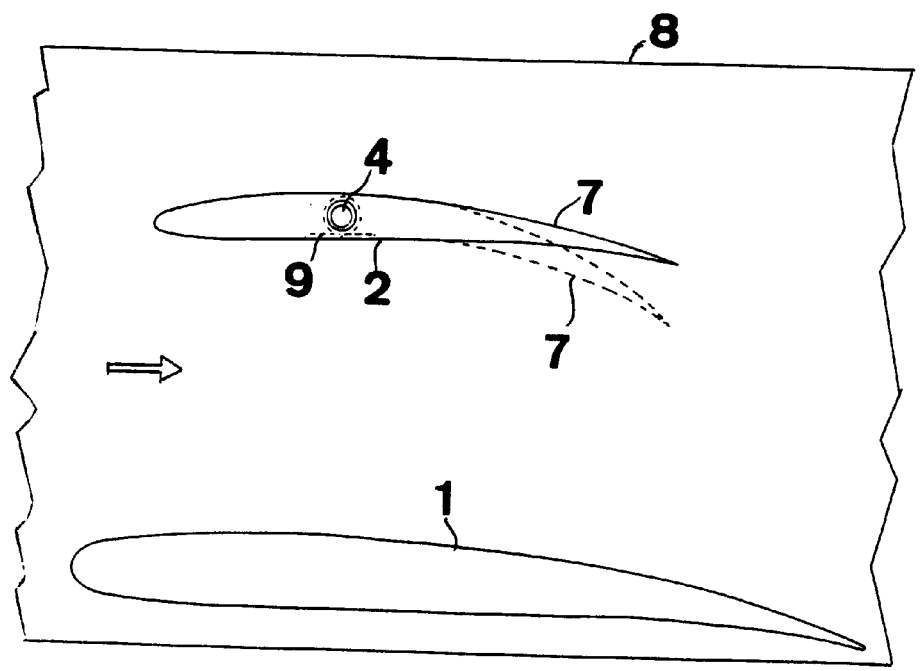
FIG. 4 shows a schematic, partial side view of a portion of the fuselage and the wing with another variant of the wing-flap.

FIG. 4 consists of the wing 1, the wing-flap 2, the rotating shaft of the wing-flap 4 and its extend bands or springs 9 that assist or complement the action of the smaller portion of the wing-flap. Where 7 is the flexible part at high speed and 7' at low speed. At low speeds, the complete wing-flap is extended by the action of spring 9.

The oncoming air ram is indicated by an arrow.

What is claimed is:

1. An automatic wing-flap apparatus for aircraft with a fuselage having opposed wings comprising:
   an aircraft fuselage having a first pair of opposed wings one on each side of said fuselage,
   a second pair of opposed wing-flaps to compliment said first pair of wings, one on each side of said fuselage,
   said second pair of wing-flaps having a rotating shaft connecting each of said second pair of wing-flaps to the other, said shaft parallel to the transversal axis of said aircraft,
   each of said second pair of wing-flaps having a first part and a second part, each said first part and second part having separate surfaces,
   said first part in front of and smaller than said second part, and both said first and second parts having different resistance to oncoming air during movement of said aircraft,
   whereby a rotation torque at each of said second wing-flaps is created as a function of said aircraft's speed, such that when retracted high speed said second pair of wing-flaps adopt a horizontal flap attitude, and when said second pair of wing-flaps are extended at low air speeds they act like extended flaps, and
   springs attached to said second pair of wing-flaps assist the action of said first parts of said second pair of wing-flaps.

2. An automatic wing-flap according to claim 1, further comprising rotation end stops for holding said second pair of wing-flaps at a position of furthest retraction, at most nearly horizontal.

3. An automatic wing-flap according to claim 1, wherein said second pair of wing-flaps have slots parallel to the longitudinal axis of said second pair of wing-flaps.

4. An automatic wing-flap according to claim 1, wherein said rotating shaft is rotated with hydraulic, pneumatic actuators.

5. An automatic wing-flap according to claim 1, wherein said second pair of wing-flaps are close to the center of gravity of said aircraft.

6. An automatic wing-flap according to claim 1, wherein said second parts of said second pair of wing-flaps are divided in two additional parts, such that at low speeds, said two additional parts adopt the shape of a conventional extended flap and at high speeds, said second part rotates with reference to said first part as a function of the air speed pressure, and one or more springs between said first part and said second part that oppose said rotation.

7. An automatic wing-flap according to claim 1, wherein said second part is divided in two flexible parts, whereby at low speeds, said parts of said second part adopt the shape of a conventional extended flap and at high speeds, said parts become flexible and rotate with reference to said first part as a function of the air speed pressure.

* * * * *